United States Patent
Gudan et al.

(10) Patent No.: US 9,559,605 B2
(45) Date of Patent: Jan. 31, 2017

(54) SYSTEM FOR AMBIENT ENERGY HARVESTING

(71) Applicants: Ken Gudan, Sunnyvale, CA (US); Sergey Chemishkian, San Jose, CA (US); Matthew S. Reynolds, Seattle, WA (US); Stewart Thomas, Raleigh, NC (US); Joshua Ensworth, Seattle, WA (US)

(72) Inventors: Ken Gudan, Sunnyvale, CA (US); Sergey Chemishkian, San Jose, CA (US); Matthew S. Reynolds, Seattle, WA (US); Stewart Thomas, Raleigh, NC (US); Joshua Ensworth, Seattle, WA (US)

(73) Assignee: Ricoh Co., Ltd., Tokyo (JP)

( * ) Notice: Subject to any disclaimer, the term of this patent is extended or adjusted under 35 U.S.C. 154(b) by 82 days.

(21) Appl. No.: 14/198,357

(22) Filed: Mar. 5, 2014

(65) Prior Publication Data
US 2015/0256097 A1    Sep. 10, 2015

(51) Int. Cl.
*H02M 7/04* (2006.01)
*H02M 3/338* (2006.01)
*H02J 17/00* (2006.01)
*H02J 7/34* (2006.01)

(52) U.S. Cl.
CPC ............ *H02M 3/338* (2013.01); *H02J 17/00* (2013.01); *H02M 7/04* (2013.01); *H02J 7/345* (2013.01)

(58) Field of Classification Search
CPC ................................. H02J 17/00; H02M 7/04
USPC ................................................ 363/16–21.04
See application file for complete search history.

(56) References Cited

U.S. PATENT DOCUMENTS

| | | | | |
|---|---|---|---|---|
| 8,621,245 B2 * | 12/2013 | Shearer | ............... | G06K 19/0707 340/539.26 |
| 8,830,710 B2 * | 9/2014 | Perreault | ................... | H03H 7/38 363/67 |
| 2004/0078662 A1 * | 4/2004 | Hamel | ................ | B60C 23/0411 714/22 |
| 2006/0068749 A1 * | 3/2006 | Ismail | ................. | H03F 3/45968 455/339 |
| 2009/0200985 A1 * | 8/2009 | Zane | .................... | H01Q 1/2225 320/108 |

(Continued)

OTHER PUBLICATIONS

Sudevalayam et al., Energy Harvesting Sensor Nodes: Survey and Implicaitons, 2011, IEEE.*

*Primary Examiner* — Gary L Laxton
*Assistant Examiner* — Kyle J Moody
(74) *Attorney, Agent, or Firm* — Blakely, Sokoloff, Taylor & Zafman LLP

(57) ABSTRACT

A method and apparatus is disclosed herein for harvesting ambient energy. In one embodiment, an energy harvester comprises: a first RF rectifier to output a first voltage determined by rectified RF energy in response to received RF energy; a first energy reservoir coupled to the first RF rectifier to store energy at the first voltage; a DC/DC converter coupled to the first energy reservoir to convert the first voltage to a second voltage; a second reservoir coupled to the DC/DC converter to store energy at the second voltage, the second voltage being greater than the first voltage; and a third reservoir coupled to the second reservoir to receive energy transferred from the second reservoir periodically.

19 Claims, 6 Drawing Sheets

(56) References Cited

U.S. PATENT DOCUMENTS

| | | | | |
|---|---|---|---|---|
| 2011/0093041 A1* | 4/2011 | Straka | ............... | A61N 1/36125 607/59 |
| 2013/0132010 A1* | 5/2013 | Winger | ............. | G01R 31/3679 702/63 |
| 2013/0214611 A1* | 8/2013 | Bae | ........................ | H02M 7/06 307/104 |
| 2013/0278072 A1* | 10/2013 | Yoon | ...................... | G01R 21/00 307/104 |
| 2014/0117771 A1* | 5/2014 | Kwon | .................... | H02J 5/005 307/104 |
| 2014/0125144 A1* | 5/2014 | Nakamura | ........... | B60L 11/182 307/104 |
| 2014/0191593 A1* | 7/2014 | Moh | ....................... | H02J 5/005 307/149 |
| 2014/0290950 A1* | 10/2014 | Welsh | .................... | H01Q 1/248 166/299 |
| 2014/0354041 A1* | 12/2014 | Yoshi | ..................... | H02J 7/025 307/9.1 |
| 2015/0035378 A1* | 2/2015 | Calhoun | ........... | A61B 5/04004 307/104 |
| 2015/0054345 A1* | 2/2015 | Monat | .................... | H01F 38/14 307/104 |
| 2015/0256015 A1* | 9/2015 | Gudan | ................... | H02J 5/005 307/104 |
| 2015/0256082 A1* | 9/2015 | Gudan | ................. | H02M 3/335 320/108 |

* cited by examiner

SYSTEM FOR AMBIENT ENERGY HARVESTING

FIELD OF THE INVENTION

Embodiments of the present invention relate to the field of wireless power transfer; more particularly, embodiments of the present invention relate to radio-frequency (RF) energy harvesting devices that harvest ambient RF energy and store the received RF energy.

BACKGROUND OF THE INVENTION

Next generation sensor networks may be powered by energy harvesting techniques to avoid requiring battery maintenance. Energy harvesting is a process by which energy is derived from external sources (e.g., radio frequency energy, solar power, thermal energy, wind energy, salinity gradients, or kinetic energy), captured and stored.

Energy may be harvested from radio frequency signals propagating wirelessly. With RF harvesting, wireless energy comes from a radio frequency transmitting device that is some distance away from a device that harvests energy from the radio frequency transmission. Properties of an energy harvester include its ability to harvest energy efficiently from available RF signals, its ability to store the harvested energy efficiently with minimal storage loss, and its ability to make the stored energy available to meet the voltage, current, and duty cycle requirements of a desired application.

One of the more popular forms of RF used today is Wi-Fi (also referred to as IEEE 802.11a/b/g/n etc.) communications. Today, most Wi-Fi communications are in the 2.4 GHz and 5.8 GHz frequency bands and there are many local area networks that are based on Wi-Fi in which access points enable Wi-Fi clients to gain access to networks such as the Internet. Furthermore, the 2.4 GHz and 5.8 GHz bands also support other networking standards, such as Zigbee and Bluetooth, and other proprietary networks, each transmitting energy by communicating in this same frequency band. Additionally there are other frequency bands that support different communication protocols, each of which transmit energy when they are communicating. These include, for example, digital television (DTV) and Global System for Mobile Communications (GSM) signals.

In a traditional RFID-like setup the RFID readers (interrogators) usually deliver RF power as a continuous wave (CW), i.e. a sinusoidal signal of a particular frequency. In contrast to systems designed for use with continuous wave (CW) signals such as RFID, some RF energy harvesters are designed for use with non-CW signals such as WiFi and GSM. These waveform aware harvesters include ambient energy harvesters that harvest signals of opportunity that are already present in the environment. For these types of harvesters, the system designer must work around the waveforms and power levels that are already present in the environment.

SUMMARY OF THE INVENTION

A method and apparatus is disclosed herein for harvesting ambient energy. In one embodiment, an energy harvester comprises: a first RF rectifier to output a first voltage determined by rectified RF energy in response to received RF energy; a first energy reservoir coupled to the first RF rectifier to store energy at the first voltage; a DC/DC converter coupled to the first energy reservoir to convert the first voltage to a second voltage; a second reservoir coupled to the DC/DC converter to store energy at the second voltage, the second voltage being greater than the first voltage; and a third reservoir coupled to the second reservoir to receive energy transferred from the second reservoir periodically.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
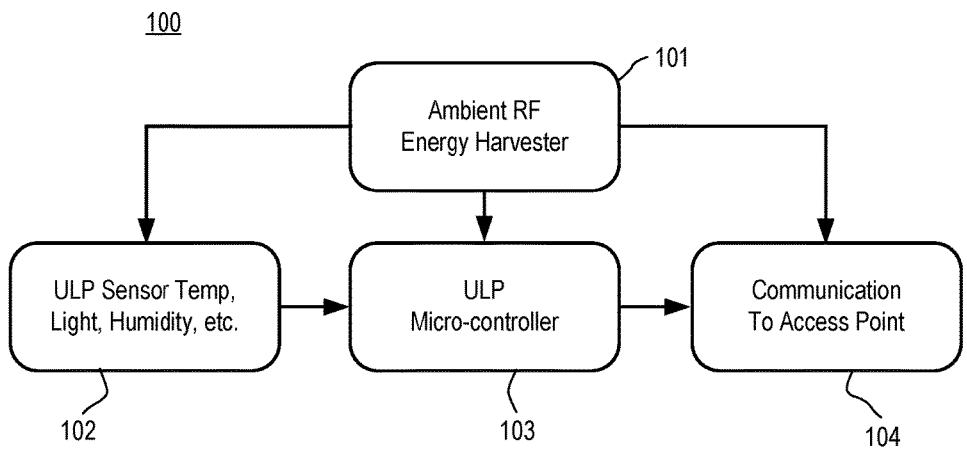
FIG. 1 is a block diagram of one embodiment of a sensor device.

A system for ambient energy harvesting and method for doing the same are described. In one embodiment, the energy harvesting system includes three DC reservoirs to store energy generated from ambient radio frequency (RF) input signals. These reservoirs are coupled together in a cascaded fashion to provide DC energy to a load.

In one embodiment, the ambient RF energy harvester is part of a sensor/tag device and is used to provide energy to one or more components of the sensor/tag device such as, for example, the sensor, a controller, a communication unit a processing device, etc.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

One Embodiment of a Sensor Device

FIG. 1 is a block diagram of one embodiment of a sensor device. The sensor device may be part of a tag. Referring to FIG. 1, sensor device 100 comprises an ambient radio-frequency (RF) energy harvester 101, an ultra-low-power (ULP) sensor 102 (e.g., temperature, light, humidity, etc.), a micro-controller 103, and a communication unit 104. Although not shown, sensor device 100 includes one or more antennas. The antennas may be part of communication unit 104 or may be separate, such as in the case of an antenna used to harvest energy.

In one embodiment, RF energy harvester 101 harvests ambient RF power to run ultra-low power tags and/or sensors 102, micro-controller 103, and/or communication unit 104, based on received RF input energy received by an antenna (not shown) of sensor device 100. There are a number of sources of ambient RF power, including, but not limited to WiFi, DTV and GSM signals. Other sources of ambient RF power include, for example, toys, proprietary communication protocols, and even stray energy leakage from devices, such as microwave ovens. The antenna receiving the RF energy input may be part of communication unit 104 or a separate antenna. The antenna(s) may be designed to receive the energy in multiple frequency bands, or there may be separate antenna(s) for these different frequency bands.

In one embodiment, sensor 102 comprises an ultra-low-power (ULP) sensor and/or tag and micro-controller 103 comprises an ultra-low-power (ULP) micro-controller. Sensor 102 may comprise a temperature sensor, a light sensor, a motion sensor, air flow sensor, image sensor, accelerometer, gyroscope, gas detector, microphone, atmospheric pressure sensor, humidity sensor, mechanical pressure sensor, etc. In one embodiment, sensor 102, as a ULP sensor, has a power requirement of 1-20 uW and a duty cycle of 1% to 10% (where the duty cycle varies in response to available energy over a period of time or the specific sensing needs, usually seconds to hours).

In one embodiment, micro-controller 103 performs control operations and/or processing for the sensor device 100. In one embodiment, controller 103 is responsive to and receives sensor data from sensor 102 and provides it to communication unit 104 for transmission (e.g., wireless transmission) from device 100. Controller 103 may also log sensor data for a time, and transmit the entire log to communication unit 104 for transmission later. Note that in this case the sensing rate and the communication rate can be different.

Communication unit 104 provides a communication mechanism for sensor device 100. In one embodiment communication unit 104 is a wireless communication unit. In one embodiment, communication unit 104 has an RF transmission along with an antenna for receiving and transmitting RF signals, including RF signals transmitted with an access point or other locally positioned device.

In one embodiment, the ambient RF energy harvester is optimized for overall efficiency and a minimum of start-up power. These optimizations improve the range at which energy can be usefully harvested and improve the number of places where ambient energy is practical, particularly in view of the fact that ambient RF energy levels are small and often bursty (traffic-dependent), rectified voltages are very low (<100 mV) at typical ranges, and typical Complementary Metal Oxide Semiconductor (CMOS) loads such as MCU etc. require 800+ mV to operate.

An energy harvester and method for performing energy harvesting are described. In one embodiment, the energy harvester converts incident radio frequency (RF) energy, or ambient RF energy, to direct current energy. In one embodiment, the energy harvester comprises: a first RF rectifier to output a first voltage determined by rectified RF energy in response to received RF energy; a first energy reservoir coupled to the first RF rectifier to store energy at the first voltage; a DC/DC boost converter coupled to the first energy reservoir to convert the first voltage to a second voltage; a second reservoir coupled to the DC/DC converter to store energy at the second voltage, where the second voltage is greater than the first voltage; and a third reservoir (e.g., a longer-term energy storage device such as a low-leakage capacitor or battery, etc.) coupled to the second reservoir to receive energy transferred from the second reservoir periodically.

In one embodiment, the RF rectifier comprises one selected from a group consisting of: a Schottky diode, a P-N junction diode, a diode-connected field effect transistor, and a tunnel diode.

In one embodiment, the first reservoir comprises a capacitor with a capacitance value determined at least in part by the envelope of the received RF energy. In one embodiment, the first reservoir comprises a capacitor having a value based on stored energy above a threshold voltage given ambient RF input power and a duty cycle of the input power. In another embodiment, the first reservoir comprises a first capacitor and the second reservoir comprises a second capacitor, wherein capacitance of the second capacitor is approximately equal to a product of the first capacitor capacitance times a square of a ratio of an expected value of the second voltage divided by an expected value of the first voltage.

In one embodiment, the second reservoir comprises an inductor used to boost the voltage, wherein energy stored in the inductor is approximately equal to energy stored in the first reservoir.

In one embodiment, the DC/DC boost converter comprises a self-excited oscillator. In one embodiment, the self-excited oscillator comprises a transistor coupled to a transformer. In one embodiment, the frequency of the self-excited oscillator is controlled at least in part by an envelope of the received RF energy. In one embodiment, the DC/DC converter is a switch mode converter with switching intervals controlled at least in part by an envelope of the received RF energy.

In one embodiment, the third reservoir is coupled to the second reservoir via a switch, which is closed periodically to transfer energy from the second reservoir to the third reservoir. In one embodiment, the switch is controlled at least in part by the envelope of the received RF energy. In one embodiment, the third reservoir is coupled to a load, and the first voltage is insufficient to operate the load directly, and the third voltage is sufficient to operate the load. In one embodiment, the third reservoir has an energy storage capacity that is greater than an energy storage capacity of the second reservoir.

Figure 2:
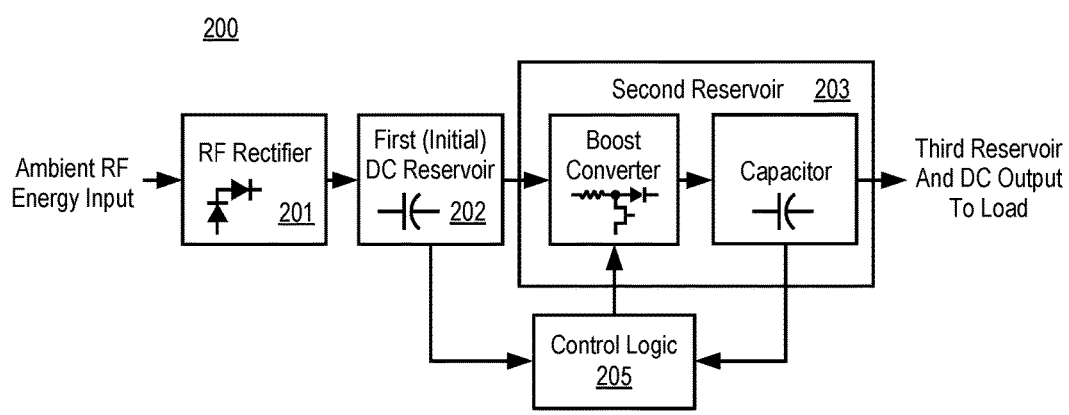
FIG. 2 is a block diagram of one embodiment of an RF energy harvester.

FIG. 2 is a block diagram of one embodiment of an RF energy harvester. Referring to FIG. 2, RF energy harvester 200 comprises RF rectifier 201, a first direct current (DC) reservoir (storage) 202, a boost converter and second reservoir 203, a third reservoir 204, and control logic 205.

RF rectifier 201 receives ambient RF energy input received from an antenna and rectifies the RF energy to produce a DC voltage.

First DC reservoir 202 stores the voltage generated from the rectified RF signals received by device 100. In one embodiment, reservoir 202 comprises a capacitor. In one embodiment, the size (value) of the capacitor that is selected for use is based on the stored energy above a voltage threshold for the ambient RF input power.

Figure 7:
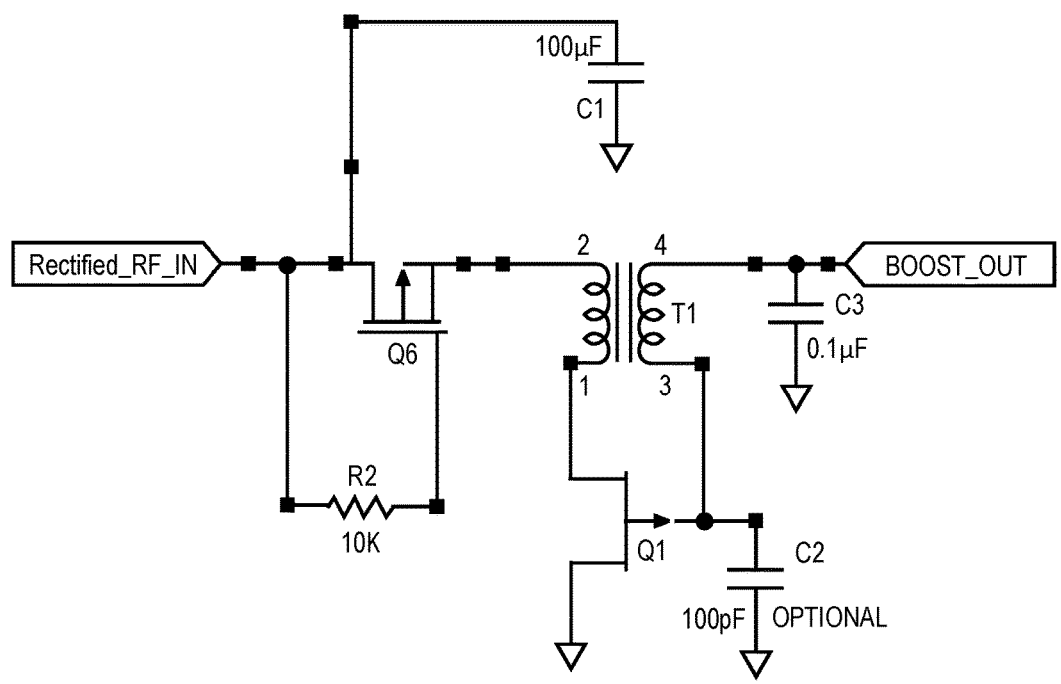
FIG. 7 illustrates one embodiment of a self-excited oscillator.
Figure 8:
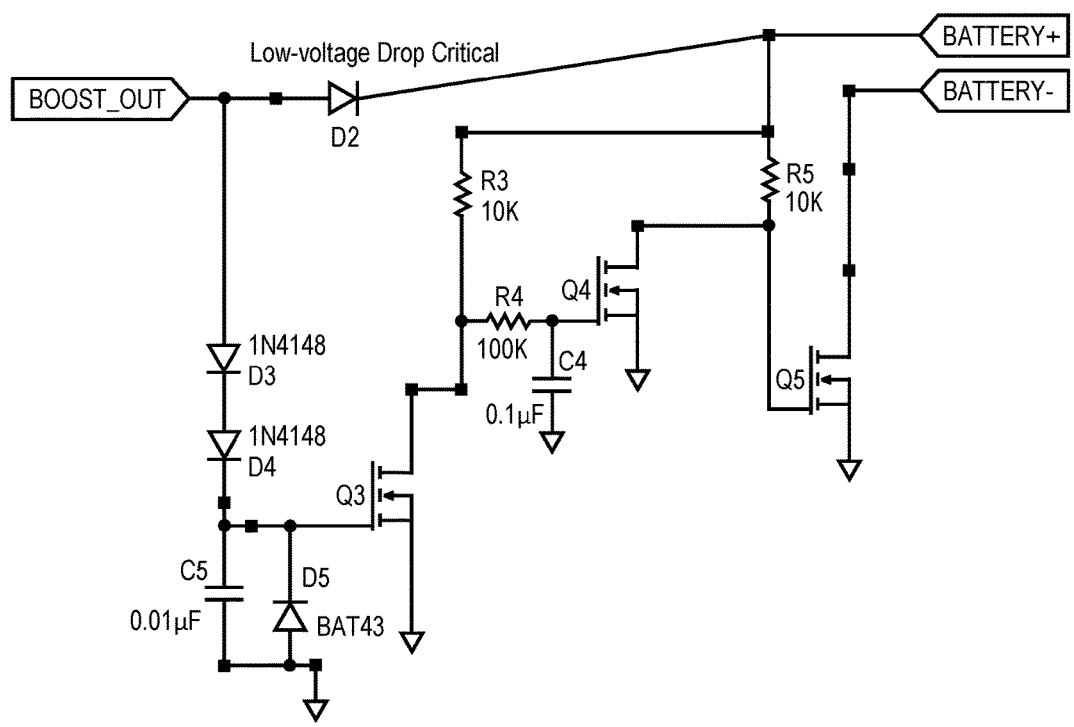
FIG. 8 illustrates one embodiment of a charger schematic.

Second DC reservoir 203 receives the voltage and increases the voltage. To increase the voltage, second DC reservoir 203 includes a DC/DC converter. In one embodiment, the DC/DC converter comprises a boost converter which includes a self-excited oscillator for operation. The self-excited oscillator includes a junction field effect transistor (JFET) coupled with a transformer. In one embodiment, the amount of the boost conversion is a function of the input energy, and the DC/DC converter is designed to maximize the output voltage as a function of input voltage in this low-energy environment. FIG. 7 illustrates one embodiment of a self-excited oscillator. Referring to FIG. 7, the embodiment of the self-excited oscillator includes an input (Rectified RF_IN), an output (BOOST_OUT), capacitors C1 (100 μF); optional C2 (100 pF); and C3 (0.1 μF), transistors Q6 and Q1, a transformer (T1), and a resistor R2 (10K) coupled as shown. FIG. 8 illustrates one embodiment of a charger schematic that receives the output of the boost converter, such as, for example, the one shown in FIG. 7. Referring to FIG. 8, the embodiment of the charger schematic includes an input (BOOST_OUT), an output to a battery (Battery+ and Battery−), diodes D2 for preventing a low-voltage drop; D3 (1N4148); D4 (1N4148); D5 (BAT43), capacitors C4 (0.1 μF) and C5 (0.01 μF), transistors Q3, Q4, and Q5, and resistors R3 (10K), R4 (100K), and R5 (10K).

The upconverted voltage from the DC/DC converter is stored in a storage device of second reservoir 203. In one embodiment, second reservoir 203 uses a capacitor to store the upconverted voltage. In another embodiment, second reservoir 203 uses an inductor to store the upconverted voltage, but this is a much shorter-term storage option.

When the energy stored in second reservoir 203 reaches a certain level, the energy is transferred to a third reservoir (not shown). Thus, the transfer occurs periodically at a rate determined by the amount of input energy. In one embodiment, the third reservoir comprises a battery, a capacitor, a supercap, etc. The third reservoir provides DC energy to a load.

In one embodiment, the load comprises a sensor, processor or microcontroller, and/or a communication unit. In one embodiment, the DC voltage from the third reservoir is able to run the load, while the voltage produced by rectifier 201 would not be able to do so.

Control logic 205 controls the energy harvesting process. In one embodiment, control logic 205 comprises a separate unit that generates control signals to control each of the reservoirs 202-3203. In another embodiment, the control is distributed through various discrete gating components such that a separate control unit is not necessary but the function is still performed.

Figure 3:
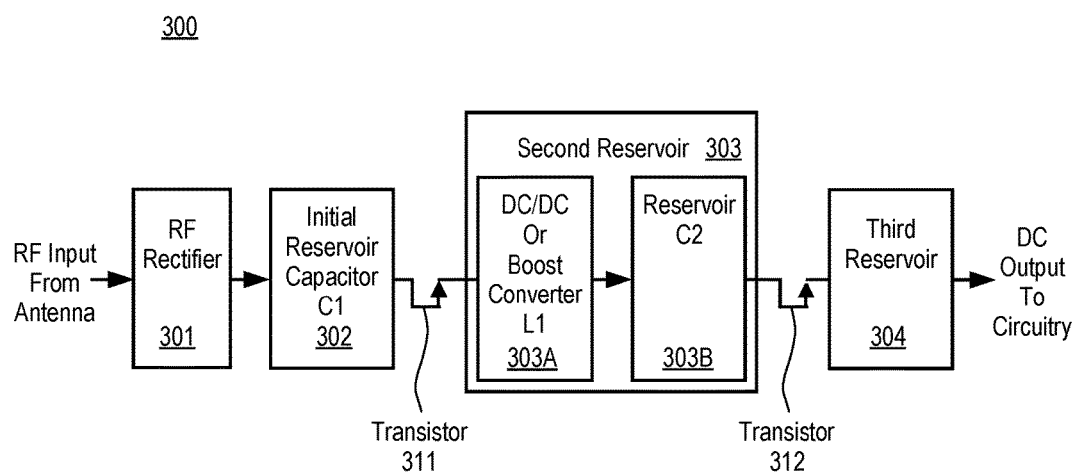
FIG. 3 is another more detailed block diagram of one embodiment of an RF energy harvester.

FIG. 3 is another more detailed block diagram of one embodiment of an RF energy harvester. Referring to FIG. 3, RF energy harvester 300 comprises RF rectifier 301, a first direct current (DC) reservoir (storage) 302, second reservoir 303, and a third reservoir 304. In one embodiment, the input to RF rectifier 301 is an RF input from an antenna on the sensor device. RF rectifier 301 converts the RF input signals to a voltage. In one embodiment, the voltage may range between 10 mV and 500 mV. The voltage is stored in reservoir 302. In one embodiment, reservoir 302 comprises a ceramic capacitor 1 uF to 100 uF or more.

In one embodiment, the stored energy from reservoir 302 is transferred to second reservoir 303 via a transistor 311, self-gated as the voltage rises in reservoir 302. In one embodiment, second reservoir 303 comprises a boost converter 303A. The boost converter 303A operates to upconvert the voltage stored in reservoir 302 and store that upconverted voltage into reservoir 303B.

The energy stored in second reservoir 303 is transferred to third reservoir 304. In one embodiment, third reservoir 304 comprises a tantalum capacitor, supercap 100 uF to 1 F or a battery. In one embodiment, transistor 312 (e.g., a FET) couples second reservoir 303 to third reservoir 304, which turns on when second reservoir 303 reaches an optimal voltage. In one embodiment, transistor 312 is controlled at least in part by the envelope of the received RF energy such that when the voltage stored in reservoir 303B reaches a certain watermark level, transistor 312 closes/turns on and the energy is transferred. In one embodiment, through the selection of high gate-threshold transistors, the voltage can build up fairly high in reservoir 303 (as much as 1-2V) before the transistor 312 closes/turns on. Transistor 312 closes/turns on automatically when the gate threshold of the transistor design is reached in reservoir 303. As soon as transistor 312 closes/turns on, the energy is transferred from reservoir 303 into reservoir 304, thus depleting the energy in reservoir 303, and the gate threshold falls below the watermark level and the transistor 312 closes/opens again. The process then repeats when the voltage in reservoir 303 becomes sufficiently high.

Note that transistor 311 and 312 may be replaced with other types of switches.

Waveform Aware Harvesting

In one embodiment, the RF waveform harvester comprises a RF to DC converter that is optimized for use with non-continuous wave (CW) signals. In another embodiment, the RF waveform harvesters are waveform aware and are able to perform ambient energy harvesting based on a waveform model, where the available RF energy is in the form of communication waveforms of a variety of types. Examples of commonly-harvested ambient RF energy sources with non-continuous wave signals include, but are not limited to, digital television (DTV) broadcasts, cellular base station transmissions (e.g., GSM, Code Division Multiple Access (CDMA)), Wi-Fi transmissions, etc.

For example, in one embodiment, WiFi is the communications waveform that is the ambient form of energy to be harvested. WiFi is bursty and has low amplitude compared to other sources of energy, where a bursty signal has a high peak to average ratio over ms to s time scale. For example, some WiFi signals have WiFi transmission burst times on the order of 1 ms. For a bursty signal, the harvester can only contribute energy to the reservoir capacitor ($C_x$) when the ambient source is transmitting.

Figure 4:
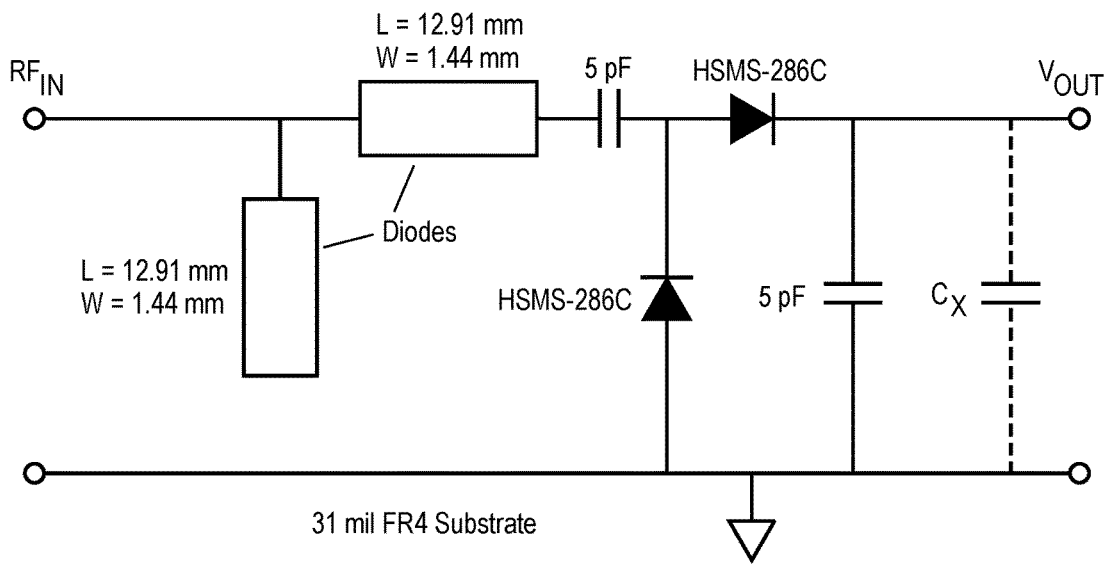
FIG. 4 illustrates a diode-based rectifier schematic.

FIG. 4 illustrates a diode-based harvester schematic. Referring to FIG. 4, in one embodiment, the harvester is designed to be well matched at input power levels below −20 dBm where the majority of ambient Wi-Fi signals are expected to fall. Thus, harvester is characterized both in terms of its input match from 2.4 GHz to 2.5 GHz, as well as for harvesting efficiency at its maximum power point (MPP). Harvesting efficiency is defined as the ratio of input RF power at the harvester to harvested DC power at the load ($\eta$=PDC/PRF).

The purpose of capacitor $C_X$ in FIG. 4 is to store charge for any subsequent active electronic circuitry. In one embodiment, typical circuit power-up threshold voltages $V_{TH}$ equals 0.8 V, as is typical for CMOS logic in commodity processes. In another embodiment, the power-up threshold voltages $V_{TH}$ equals 50 mV, as is typical for ultra-low startup voltage boost converters using JFETs. Alternatively, specially doped CMOS transistors, floating gate devices, or Silicon on Insulator (SOI) transistors may be capable of operation down to voltages approaching $V_{TH}$=50-100 mV as well.

If the usable energy is defined as the portion of the stored energy above some threshold voltage $V_{TH}$, the following describes how to find a value of $C_X$ given the ambient RF input power and the signal's duty cycle. This is based on the maximum power point curve for the harvester, the typical burst timings for the ambient signal of interest (e.g., WiFi with some traffic model), and a time domain response for the harvester as a function of $C_X$. Thus, in one embodiment, the storage capacitor selection $C_X$ is optimized on the time scale of network traffic for the signal being harvested.

Figure 5:
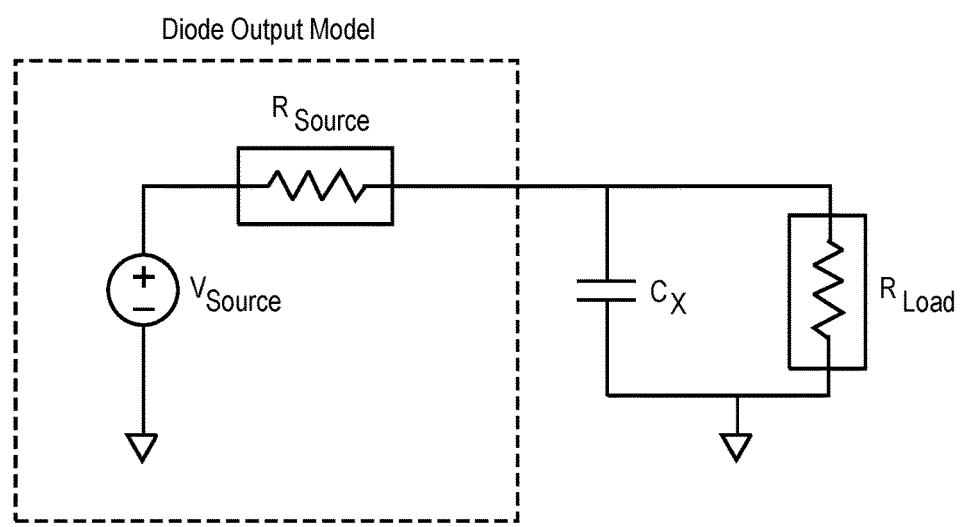
FIG. 5 illustrates a diode output circuit model.

FIG. 5 illustrates a diode output circuit model. Because the diode is a non-linear device, the power delivered to the load varies dramatically with load impedance. The Maximum Power Point Tracking (MPPT) circuit functions as a load impedance converter to maximize the power delivered to the load, given a particular nonlinear operating point.

Referring to FIG. 5, the diode output model consists of an open-circuit voltage $V_{source}$ along with a nonlinear source resistance $R_{source}$. The pair, $V_{source}$, $R_{source}$, represents a fixed operating point at maximum power-point (MPP). The load resistance $R_{load}$ includes any leakage currents in $C_X$ as well as the quiescent current of the active circuitry attached to the harvester. In other words, the load impedance $R_{load}$ is chosen a priori based on the MPP of the harvester at a given ambient signal level (the maximum power point of the harvester given the input power). Using this model, only the effect of varying $C_X$ (not other system conditions) is considered.

Figure 6A:
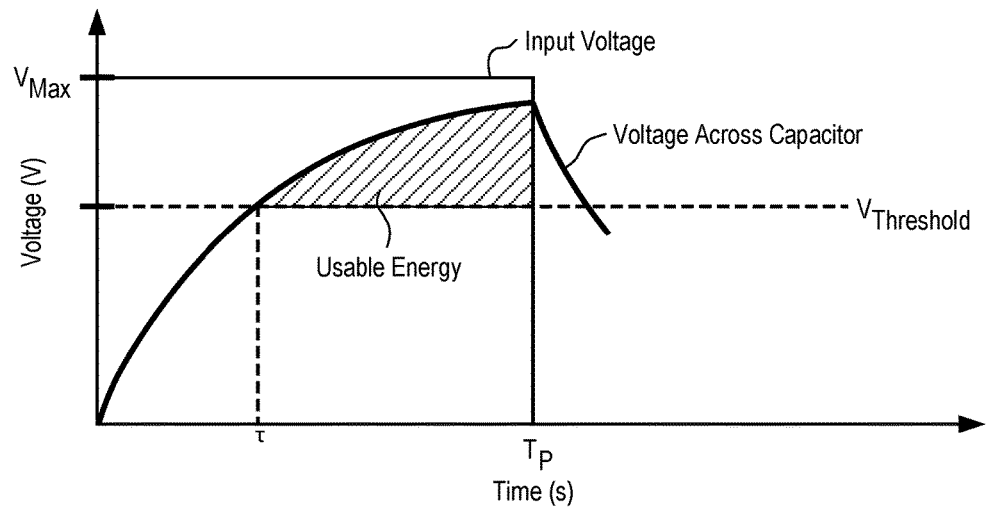
FIG. 6A illustrates the usable energy stored in capacitor $C_X$ during one transmission burse of duration $T_p$.

FIG. 6A illustrates the usable energy stored in capacitor $C_X$ during one transmission burse of duration $T_p$. Referring to FIG. 6A, the usable energy in $C_X$ is represented as the shaded portion of the curve above the voltage threshold and below the voltage across the capacitor.

Figure 6B:
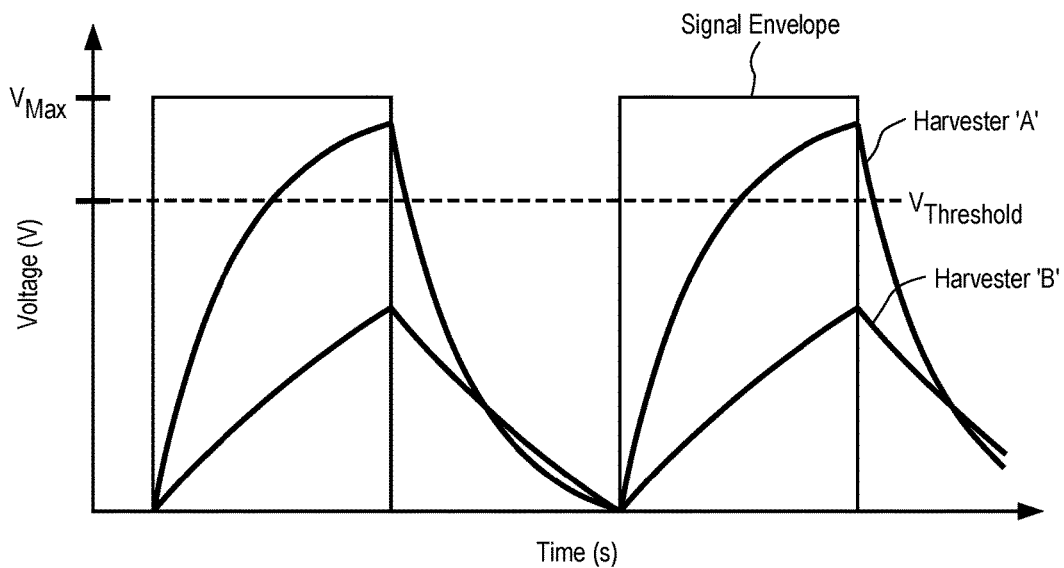
FIG. 6B illustrates examples of good and bad choices of $C_X$.

FIG. 6B illustrates examples of good and bad choices of $C_X$. If $C_X$ is too large, the active circuitry will never be powered because the input energy is insufficient to generate voltage above the threshold. On the other hand, if $C_X$ is minimized, little energy will be stored in the reservoir $C_X$ and the runtime of the active circuitry will not extend beyond the transmission intervals of the RF source. Referring to FIG. 6, harvesters 'A' and 'B' represent different choices for $C_X$ with the same conditions otherwise. In harvester A, $C_X$ looks appropriate as the output voltage exceeds $V_{TH}$ during each burst, while in harvester B, $C_X$ is too big and the output voltage never exceeds $V_{TH}$ so there is no usable energy.

An expression is derived for the useful-energy-maximizing reservoir capacitance $C_X$ as a function of ambient RF signal duty cycle and the load impedance RL at a diode harvester's maximum power point. The expression may be used to calculate the usable energy as a function of the known parameters and the unknown capacitance $C_X$.

The total energy in $C_X$ may be expressed as follows:

$$E = \frac{1}{2}CV^2$$

where C is the capacitance and V is the terminal voltage of $C_X$. It is assumed that the energy stored on the capacitor is only usable when the capacitor voltage is above the desired threshold $V_{TH}$. The usable energy is thus the difference between the stored energy at the end of an RF transmission (at time t=$T_p$) and the stored energy when $C_X$ is charged only to $V_{TH}$ and is expressed as follows:

$$E_{usable} = \frac{1}{2}C[V_{T_p}^2 - V_{th}^2]$$

where $V_{T_p}$ is the terminal voltage on $C_X$ at the end of an RF transmission (e.g., at the end of each burst) of duration $T_p$ and is expressed as:

$$V_{T_p} = V_{src}(1-e^{-T_p/R_LC})$$

By substitution, the equation for the usable energy may be re-written in terms of C and the known values of $R_L$, $V_{TH}$ and $T_p$ as follows:

$$E_{usable} = \frac{1}{2}CV_{T_p}^2\left[e^{-\frac{2T_p}{R_LC}} - 2e^{-\frac{T_p}{R_LC}} + \left(1 - \left(\frac{V_{th}}{V_{T_p}}\right)^2\right)\right]$$

The equation may be solved for $E_{usable}$ as a function of $C_X$.

Thus, a new class of RF energy harvesters, referred to herein as waveform aware harvesters, have been described. These RF energy harvesters are RF to DC converters that are optimized for their performance with non-CW signals.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. An energy harvester to convert incident radio frequency (RF) energy associated with an RF signal to direct current energy, the energy harvester comprising:
   a first RF rectifier to output a first voltage determined by rectified RF energy in response to received RF energy;
   a first energy reservoir coupled to the first RF rectifier to store energy at the first voltage;
   a DC/DC converter coupled to the first energy reservoir to convert the first voltage to a second voltage;
   a second reservoir coupled to the DC/DC converter to store energy at the second voltage, the second voltage being greater than the first voltage; and
   a third reservoir coupled to the second reservoir to receive energy transferred from the second reservoir periodically and coupled to a load, wherein the third reservoir comprises a capacitor having a capacitance value chosen to control an amount of usable energy stored in the third reservoir as a function of an RF transmission duration, the impedance of the load, and a threshold voltage, the usable energy being a portion of the stored energy above the threshold voltage.

2. The energy harvester defined in claim 1 wherein the third reservoir is coupled to the second reservoir via a first switch, the first switch being closed periodically to transfer energy from the second reservoir to the third reservoir.

3. The energy harvester defined in claim 2 wherein the first switch is controlled at least in part by an envelope of the received RF energy signal.

4. The energy harvester defined in claim 1 wherein the first voltage is insufficient to operate the load directly, and the third voltage is sufficient to operate the load.

5. The energy harvester defined in claim 1 wherein the DC/DC converter comprises a self-excited oscillator.

6. The energy harvester defined in claim 5 wherein frequency of the self-excited oscillator is controlled at least in part by an envelope of the received RF energy signal.

7. The energy harvester defined in claim 1 wherein the DC/DC converter comprises a boost converter.

8. The energy harvester defined in claim 1 wherein the first reservoir comprises a capacitor with a capacitance determined at least in part by an envelope of the received RF energy signal.

9. The energy harvester defined in claim 1 wherein the DC/DC converter is a switch mode converter with switching intervals controlled at least in part by the envelope of the received RF energy signal.

10. The energy harvester defined in claim 1 wherein the RF rectifier comprises one or more diodes selected from a group consisting of: a Schottky diode, a P-N junction diode, a diode-connected field effect transistor, and a tunnel diode.

11. The energy harvester defined in claim 1 wherein the third reservoir has an energy storage capacity that is greater than an energy storage capacity of the second reservoir.

12. The energy harvester defined in claim 1 wherein the second reservoir comprises an inductor, wherein energy stored in the inductor is approximately equal to energy stored in the first reservoir.

13. The energy harvester defined in claim 1 wherein the capacitance value is chosen to maximize the amount of usable energy stored in the third reservoir as a function of the RF transmission duration, the impedance of the load, and the threshold voltage.

14. An energy harvester to convert incident radio frequency (RF) energy to direct current energy, the energy harvester comprising:
   a first RF rectifier to output a first voltage determined by rectified RF energy in response to received RF energy;
   a first energy reservoir coupled to the first RF rectifier to store energy at the first voltage;
   a DC/DC converter coupled to the first energy reservoir to convert the first voltage to a second voltage;
   a second reservoir coupled to the DC/DC converter to store energy at the second voltage, the second voltage being greater than the first voltage; and
   a third reservoir coupled to the second reservoir to receive energy transferred from the second reservoir periodically, wherein the first reservoir comprises a first capacitor and the second reservoir comprises a second capacitor, wherein capacitance of the second capacitor is approximately equal to a product of the first capacitor capacitance times a square of a ratio of an expected value of the second voltage divided by an expected value of the first voltage.

15. A device comprising:
   an antenna;
   a load; and
   an energy harvester coupled to the antenna and the load, wherein the energy harvester comprises
   a first RF rectifier to output a first voltage determined by rectified RF energy in response to received RF energy;
   a first energy reservoir coupled to the first RF rectifier to store energy at the first voltage;
   a DC/DC converter coupled to the first energy reservoir to convert the first voltage to a second voltage;
   a second reservoir coupled to the DC/DC converter to store energy at the second voltage, the second voltage being greater than the first voltage; and
   a third reservoir coupled to the second reservoir to receive energy transferred from the second reservoir periodically, wherein the third reservoir comprises a capacitor having a capacitance value chosen to control an amount of usable energy stored in the third reservoir as a function of an RF transmission duration, the impedance of the load, and a threshold voltage, the usable energy being a portion of the stored energy above the threshold voltage.

16. The device defined in claim 15 wherein the third reservoir is coupled to the second reservoir via a switch, the switch being closed periodically to transfer energy from the second reservoir to the third reservoir.

17. The device defined in claim 15 wherein the third reservoir is coupled to the load, and wherein the first voltage is insufficient to operate the load directly, and the third voltage is sufficient to operate the load.

18. The device defined in claim 15 wherein the DC/DC converter comprises a boost converter.

19. The energy harvester defined in claim 15 wherein the capacitance value is chosen to maximize the amount of usable energy stored in the third reservoir as a function of the RF transmission duration, the impedance of the load, and the threshold voltage.

* * * * *